US012322186B1

(12) United States Patent
Koskinen et al.

(10) Patent No.: US 12,322,186 B1
(45) Date of Patent: Jun. 3, 2025

(54) METHOD AND SYSTEM FOR CAPTURING AND STORING SIGNIFICANT SURVEILLANCE IMAGES USING A PLURALITY OF I/R WAVELENGTHS

(71) Applicant: Flock Group Inc., Atlanta, GA (US)

(72) Inventors: Samu Koskinen, Atlanta, GA (US); Tomi Sokeila, Atlanta, GA (US); Thomas Michael Pethtel, II, Atlanta, GA (US)

(73) Assignee: Flock Group Inc., Atlanta, GA (US)

( * ) Notice: Subject to any disclaimer, the term of this patent is extended or adjusted under 35 U.S.C. 154(b) by 0 days.

(21) Appl. No.: 18/893,415

(22) Filed: Sep. 23, 2024

(51) Int. Cl.
*G06V 20/54* (2022.01)
*G06V 20/62* (2022.01)
*H04N 23/11* (2023.01)
*H04N 23/60* (2023.01)

(52) U.S. Cl.
CPC ............ *G06V 20/54* (2022.01); *G06V 20/625* (2022.01); *H04N 23/11* (2023.01); *H04N 23/64* (2023.01)

(58) Field of Classification Search
CPC ...... G06V 20/54; G06V 20/625; H04N 23/64; H04N 23/11
USPC ......................................................... 348/148
See application file for complete search history.

(56) References Cited

U.S. PATENT DOCUMENTS

| | | | |
|---|---|---|---|
| 7,619,680 B1* | 11/2009 | Bingle | H04N 23/55 348/361 |
| 10,559,200 B1 | 9/2020 | Langley et al. | |
| 2003/0156755 A1* | 8/2003 | Watanabe | G06V 20/62 382/176 |
| 2013/0229518 A1* | 9/2013 | Reed | H04N 23/74 348/148 |
| 2017/0236019 A1* | 8/2017 | Watson | G06V 10/143 382/105 |

(Continued)

FOREIGN PATENT DOCUMENTS

| | | |
|---|---|---|
| KR | 101283839 B1 | 7/2013 |
| WO | WO-2017173017 A1 * | 10/2017 |

OTHER PUBLICATIONS

Csaba Nagy-Amigo, Illumination for ANPR: When You Need It and How to Choose Between Different Light Sources, Journal—Source of Literature Adaptive Recognition, Date of Publication Mar. 22, 2023; 6 Pages; www.https://adaptiverecognition.com/blog/traffic-transportation/illumination-for-anpr-when-you-need-it-and-how-to-choose-between-different-light-sources/ (accessed Apr. 19, 2024).

*Primary Examiner* — Kathleen M Walsh
(74) *Attorney, Agent, or Firm* — SMITH TEMPEL; Steven P. Wigmore

(57) ABSTRACT

A method and system may include a first light source for generating infrared light at a first wavelength. The system and method may include a second light source for generating infrared light at a second wavelength that is different from the first wavelength. The system and method may also include a camera module for activating the first infrared light source to capture a first image of an object with the first infrared light source. The camera system may determine if a second image of the object is needed using the second light source. The camera system may then capture a second image of the object with the second infrared light source if the camera system determines that the second image of the object is needed. The system may further include a motion detector for detecting motion of the object. The object may comprise a license plate of a vehicle.

19 Claims, 8 Drawing Sheets

(56) References Cited

U.S. PATENT DOCUMENTS

| | | | |
|---|---|---|---|
| 2019/0163980 A1* | 5/2019 | Johnson | G08G 1/0175 |
| 2019/0318622 A1* | 10/2019 | Shideler | G06V 10/147 |
| 2022/0067394 A1 | 3/2022 | Suksi et al. | |
| 2022/0148320 A1* | 5/2022 | Alakarhu | G08G 1/0175 |
| 2023/0049184 A1* | 2/2023 | Alakarhu | B60S 1/04 |
| 2023/0112788 A1 | 4/2023 | Blais-Morin et al. | |
| 2023/0144434 A1* | 5/2023 | Song | H04N 23/11 |
| | | | 382/105 |

* cited by examiner

METHOD AND SYSTEM FOR CAPTURING AND STORING SIGNIFICANT SURVEILLANCE IMAGES USING A PLURALITY OF I/R WAVELENGTHS

DESCRIPTION OF THE RELATED ART

License Plate Recognition (LPR) cameras are often used by law enforcement personnel in order to identify and track automobiles who may be associated with operators who commit traffic violations. LPR cameras are also used by law enforcement personnel to identify and track automobiles of operators who may be wanted criminals or operators who may be conspiring to commit future crime(s).

Conventional LPR cameras may often face problems with LPR due to bad lighting conditions for a license plate during evening hours (i.e. at night/darkness) and/or during inclement weather (i.e. rain, sleet, snow, fog, clouds, etc.). To illuminate license plates during such adverse lighting conditions, an LPR camera may use infra-red (I/R) light to bounce off the license plate in order to provide better contrast between the background of the plate and the alphanumeric characters present on the plate. However, as of this writing, many governments have issued license plates where the color of the background of the plate may not provide a sufficient amount of contrast against alphanumeric characters of a license plate for LPR, even when illuminated by I/R light of higher wavelengths (i.e. 850.0 nm, 940.0 nm).

What is needed in the art are intelligent LPR cameras that are able to significantly conserve power while being able to reduce or eliminate problems with LPR due to bad lighting conditions by determining what wavelength(s) of the I/R spectrum may provide for better recognition of a license plate by comparing images captured with two or more I/R wavelengths.

SUMMARY OF THE INVENTION

A computer-implemented method and system for capturing surveillance images may include a first light source for generating infrared light at a first wavelength. The system and method may further include a second light source for generating infrared light at a second wavelength that is different from the first wavelength. The system and method may also include a camera module for activating the first infrared light source to capture a first image of an object with the first infrared light source.

The camera module may determine if a second image of the object is needed using the second light source. The camera module may then capture a second image of the object with the second infrared light source if the camera module determines that the second image of the object is needed.

The system may further include a motion detector for detecting motion of the object. The object may comprise a license plate of a vehicle. The first wavelength may be greater than the second wavelength.

The first wavelength may be between about 781.0 nm to about 2500.0 nm. Meanwhile, the second wavelength may be between about 700.0 nm to about 780.0 nm and is visible to a human eye.

According to another aspect, the system and method may include a first light emitting diode (LED) for generating infrared light at a first wavelength. The method and system may further include a second light emitting diode (LED) for generating infrared light at a second wavelength that is different from the first wavelength. The system and method may also include a camera module that activates the first LED to capture a first image of an object with the first LED. The camera module may determine if a second image of the object is needed using the second LED. The camera module may capture a second image of the object with the second LED if the camera module determines that the second image of the object is needed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION OF EXEMPLARY EMBODIMENTS

Figures 1A, 1B:
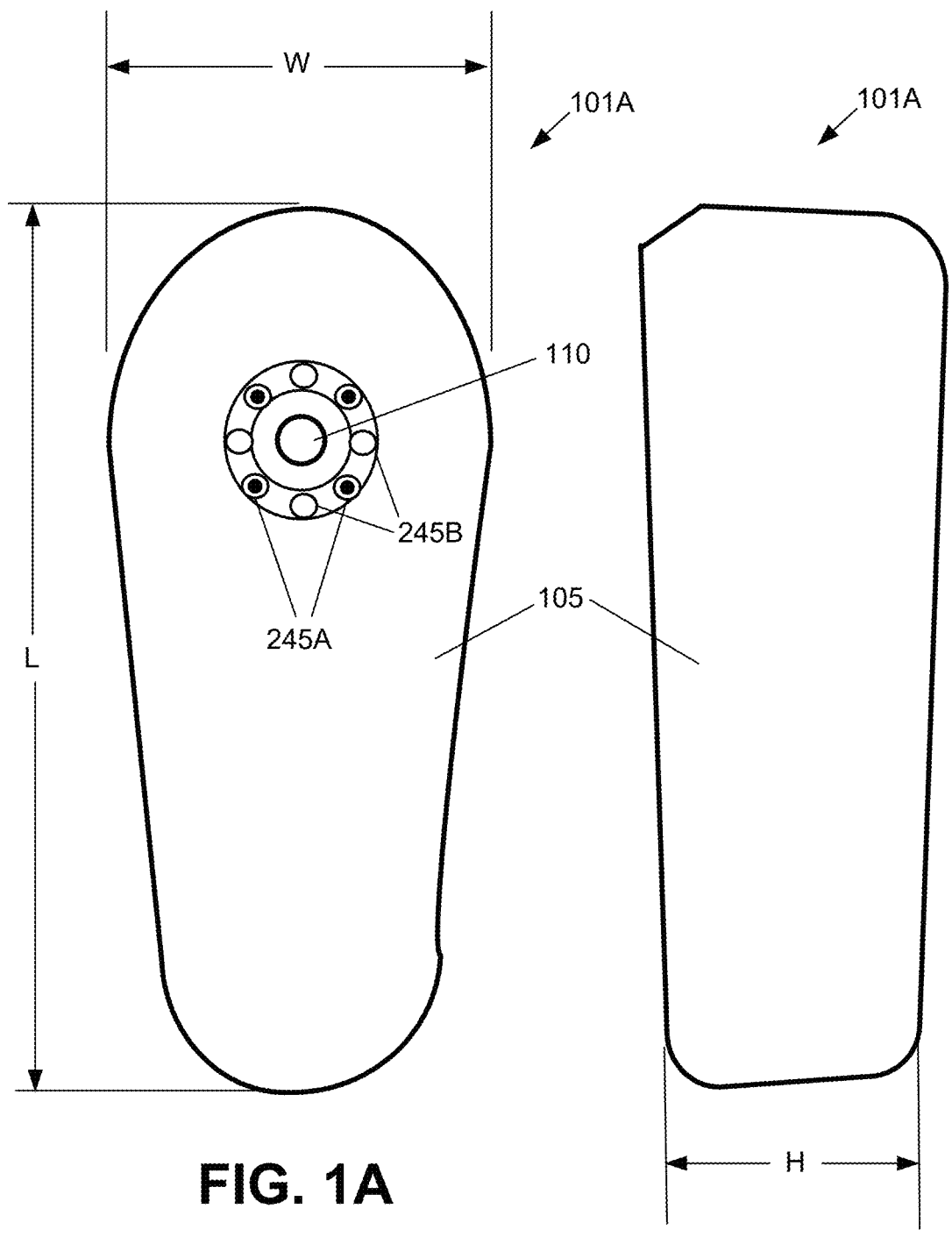
FIG. 1A is a front view of an exemplary camera system according to one exemplary embodiment of the invention.
FIG. 1B is a side view of the exemplary camera system illustrated in FIG. 1A according to one exemplary embodiment.

The term "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

Individual image frames contain "content" which is whatever was captured by the image whether it be a human, an animal, a vehicle, a tree, an empty parking lot, etc. In this description, an "identifiable" object is any object within a video frame or frame composite for which all relevant features are detected and are independent from all other features detected from other partially or wholly identifiable objects. An object is "readable" if a symbology associated with an identified object may be accurately decoded or interpreted.

In this description, two identifiable and readable objects captured in separate images may be considered equivalent, and thus the same object, if an object similarity probability calculation exceeds a given threshold. Depending on embodiment, such a probability calculation may consider the statistical significance of similarity among the objects' respective fingerprints, relative locations, object neighborhood, etc.

In this description, the terms "surveillance device," "portable recording device" and "video surveillance cameras" and the like are used interchangeably unless indicated otherwise. Examples of these devices may be, but are not limited to being a smartphone, a navigation device, a tablet personal computer ("PC"), a camera system, a commercial security system, a home security system, a traffic monitoring system, or a hand-held computer with a wireless connection or link.

In this description, the term "neural network" refers to an algorithmic system customized to identify objects and/or aspects of identified objects in a manner modeled after human cognitive processing. As would be understood by one of ordinary skill in the art, neural networks "learn" (i.e. progressively improve performance on) tasks by considering examples, generally without task-specific programming.

For example, embodiments of the solution seeking to identify objects recognized in an image frame might leverage neural networks that learn to identify images that contain automobiles by analyzing example images that have been manually labeled as "automobile" or "no automobile" and using the results to identify automobiles in other images. Advantageously, embodiments of the solution may take a positive output from one neural network as an input to another, more specialized neural network in order to further and more precisely identify the object in an image frame.

For example, embodiments of the solution may take a positive identification of an automobile and input the image into a neural network that has learned to identify color by analyzing example images that have been manually labeled as "blue" or "not blue", etc. and using the results to identify the color of objects in other images. In this way, embodiments of the solution may leverage a logical cascade of neural networks to identify an object in an image frame captured by a surveillance camera, determine the class of the object (e.g., it's an automobile), and determine aspects of the object (e.g., it's a blue, 2009 Ford Taurus with a single occupant).

As used in this description, the terms "component," "database," "module," "system," "engine", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer.

By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Referring now to the drawings, wherein the showings are for purposes of illustrating certain exemplary embodiments of the present disclosure only, and not for purposes of limiting the same, FIG. 1A is a front view of an exemplary camera system 101A according to one exemplary embodiment of the invention. The camera system 101A may comprise a housing 105.

The housing 105 as illustrated in FIG. 1A may comprise an elongated elliptical shape according to one exemplary embodiment. However, other geometries for the housing 105 are possible and are included within the scope of this disclosure. Other geometries for the housing 105 include, but are not limited to, oval, square, rectangular, triangular, etc.

The housing 105 may have a length dimension L, a width dimension W, and a height dimension H (see FIG. 1B). The length dimension L may comprise a length of about 8.0 inches while the width dimension W may comprise a width of about 4.0 inches. The height dimension H may comprise a height of about 3.0 inches. However, other dimensions, especially for different shapes of the housing 105 as noted above, are possible and are included within the scope of this disclosure.

The housing 105 may comprise an aperture 110. The aperture 110 may comprise glass or a plastic cover which is transparent. The aperture 110 may be designed to receive a lens 310 of a camera module 305 (see FIG. 3) which may help capture images facing this side of the housing 105 as illustrated in FIG. 1A.

Figure 2:
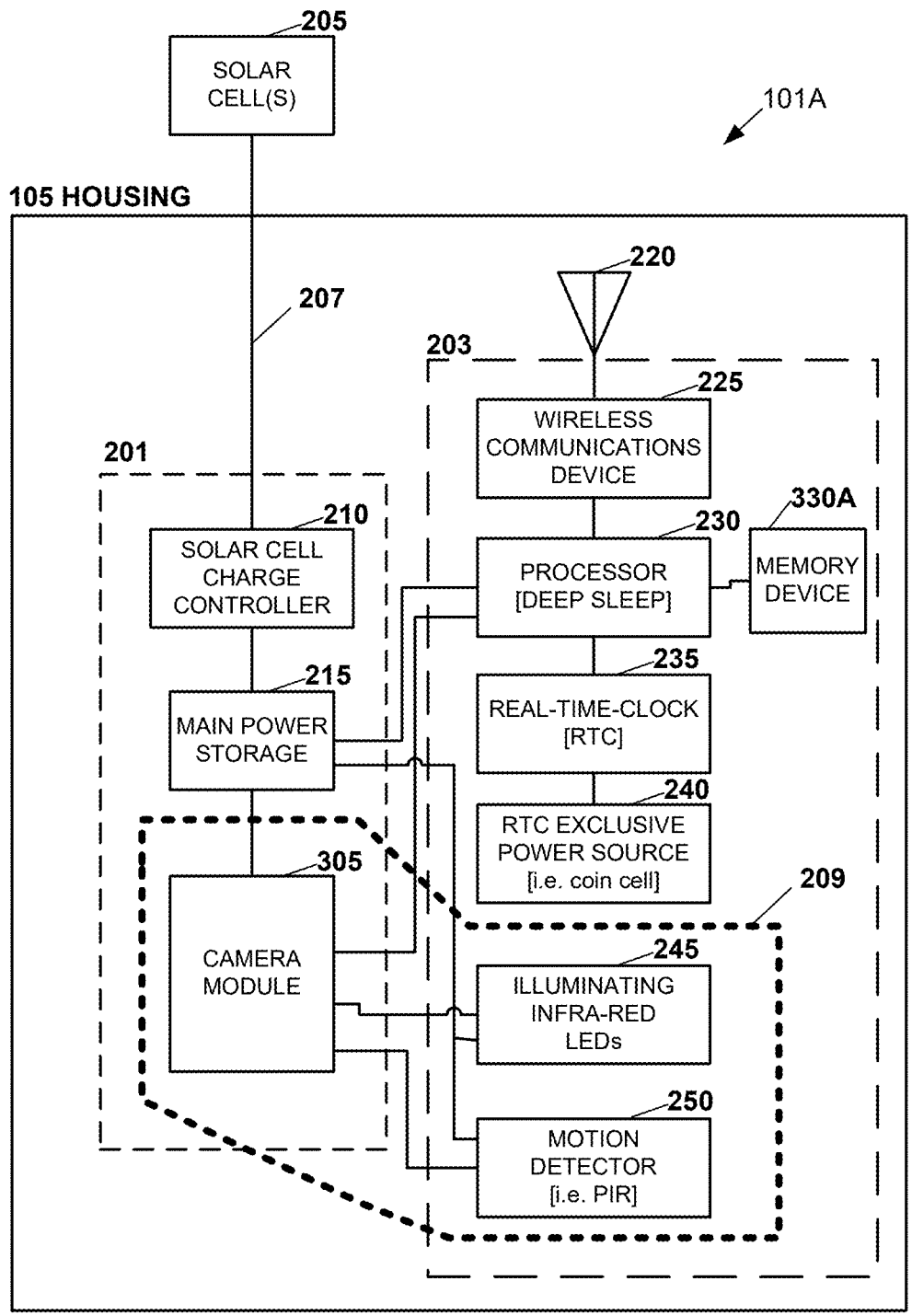
FIG. 2 is a functional block diagram of the hardware and/or software contained within one exemplary embodiment of the camera system.

Surrounding/circumnavigating the aperture 110 may comprise a plurality of illuminating infra-red light emitting diodes (LEDs) 245 (see also FIG. 2). The LEDs 245 may comprise a first set of LEDs 245A and a second set of LEDs 245B. The first set of LEDs 245A may emit I/R light of a first wavelength. Meanwhile, the second set of LEDs 245B may emit I/R light of a second wavelength, where the second wavelength is shorter than the first wavelength.

According to one exemplary embodiment, the first I/R wavelength may comprise a magnitude of about 850.0 nanometers. Meanwhile, the second I/R wavelength may comprise a magnitude of about 740.0 nanometers. Other I/R wavelengths include, but are not limited to, 940.0 nm as well as the entire infrared (I/R) spectrum/range, which falls between about 700.0 nm to about 2500.0 nm.

The first I/R wavelength of the first set of LEDs 245A is generally selected such that it is not visible or perceptible by the human eye. Typically, I/R light between about 700.0 nm and about 780.0 nm may be visible by the human eye, while I/R light between about 781.0 nm to about 2500.0 nm may be invisible (not visible) to the human eye. Thus, this first, longer wavelength of 850.0 nm (or a set of more than one wavelengths) may be selected to be invisible to the human eye so that the I/R light sources 245A do not attract attention from a human subject (i.e. are not surprising and/or distracting to a human subject) within the field of view of the camera system 101 that would typically include the field of view originating from the aperture 110.

However, other I/R wavelengths for the first set of LEDs 245A are possible and are included within the scope of this disclosure. Other "longer" I/R wavelengths for the first set of LEDs 245A not visible to the human eye besides 850.0 nm include, but are not limited to, I/R wavelengths between about 781.0 nm to about 2500.0 nm.

Meanwhile, the second I/R wavelength of the second set of LEDs 245B may be visible or perceptible by the human eye. So the second, "shorter" I/R wavelength of about 740.0 nm may be visible to the human eye (or at least very close/proximate to each LED 245B itself as understood by one of ordinary skill in the art). However, other "shorter" I/R wavelengths for the second set of LEDs 245B are possible and are included within the scope of this disclosure. Other "shorter" I/R wavelengths for the second set of LEDs 245B besides 740.0 nm include, but are not limited to, I/R wavelengths between about 700.0 nm to about 780.0 nm.

The inventive camera system 101 is also not limited to just a first set of LEDs 245A and a second set of LEDs 245B for illuminating objects at two different I/R wavelengths. The camera system may employ multiple sets of LEDs 245 having third, fourth, fifth, and sixth I/R wavelengths different from the first and second I/R wavelengths. That is, a fewer number of LEDs 245 may be employed or a greater number of LEDs 245 may be employed without departing from the scope of this disclosure as understood by one of ordinary skill in the art. And any combination of different I/R wavelengths may be employed by system 101 without departing from the scope of this disclosure.

Referring now to FIG. 1B, this figure is a side view of the exemplary camera system 101A illustrated in FIG. 1A according to one exemplary embodiment. As noted previously, the height dimension H may have a magnitude of about 2.0 inches. However, other magnitudes larger or smaller are possible for dimension H and are included within the scope of this disclosure.

Figure 1C:
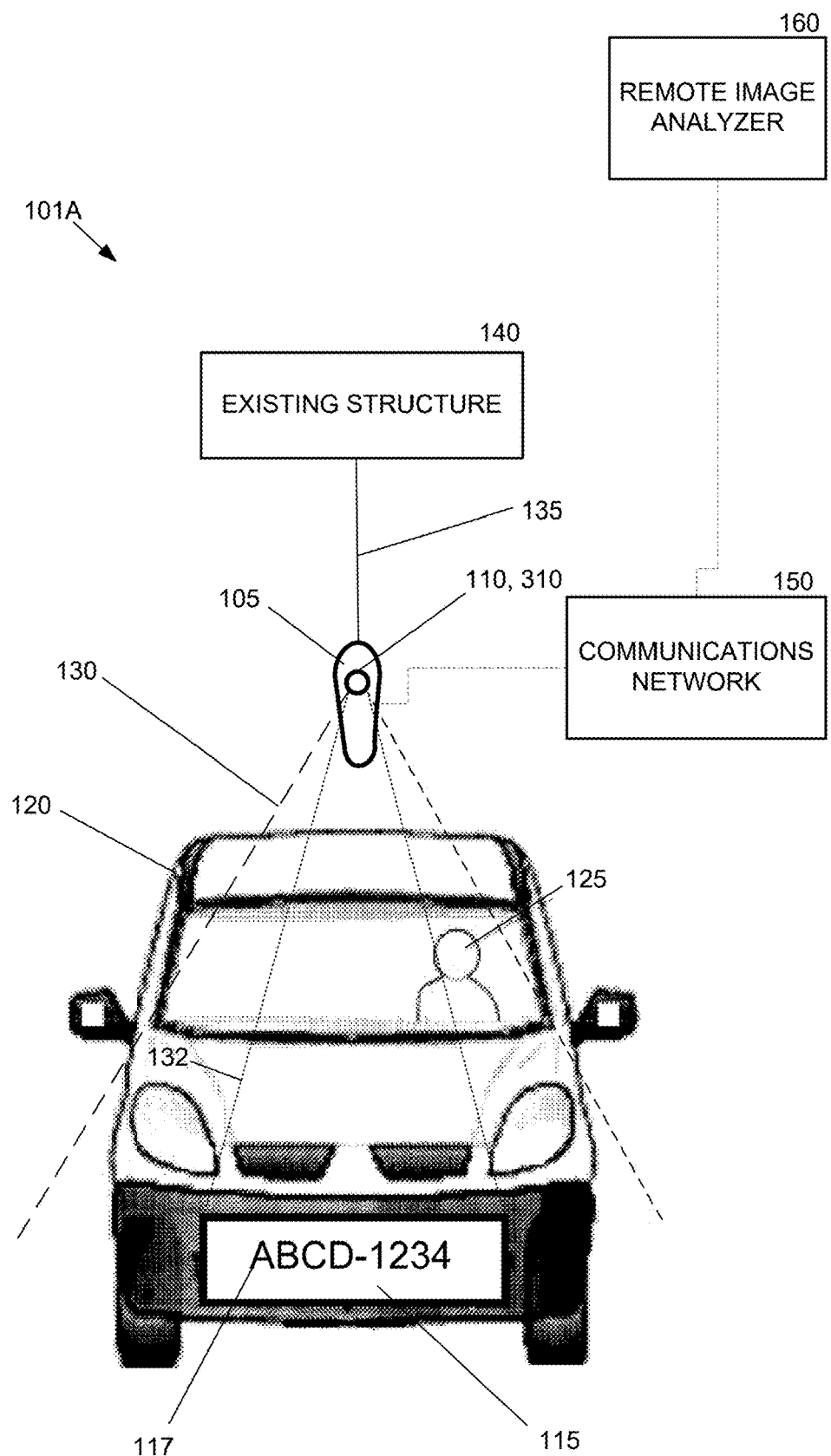
FIG. 1C is another view of an exemplary camera system which illustrates a communications network and a remote server for processing images captured by a camera in the camera system.

FIG. 1C is another view of an exemplary camera system 101A which illustrates a communications network 150 and a remote image analyzer 160 for processing images captured by a camera in the camera system. Specifically, the camera system 101A may comprise the camera housing 105 for protecting its hardware (See FIG. 2) and/or software and the system 101A may further comprise the communications network 150. The communications network 150 may be coupled to the remote image analyzer 160. The communications network 150 may comprise a wide area network ("WAN"), the plain-old-telephone-system ("POTS), a local area network ("LAN"), the Internet, or any combination of these and other types of networks.

The camera system 101A may also have illuminating infrared light emitting diodes (LEDs) 245 (See FIG. 2) that generate a second field of view 132 (narrower cone shape) within the first field of view 130. The lens 310 of the camera system 101A (that is within the aperture 110) may have a first field of view 130 for the images it captures. The first field of view 130 may have a magnitude between about 1.0 degree to 360.0 degrees.

The illuminating infrared LEDs 245 may generate the second field of view 132 in order to illuminate reflective objects such as license plates. The illuminating infrared LEDs 245 are often used by the camera system 102 when image capturing conditions may not be ideal, such as during darkness and during inclement weather (i.e. during rain, snow, etc.) when visibility is poor, as described previously.

The second field of view 132 produced by the illuminating infrared LEDs 245 may have a magnitude which is less than the first field of view 130 or the second field of view 132 may have a magnitude that is equal to the first field of view. The distance or range for the illuminating infrared LEDs 245 may comprise a magnitude between about zero to about 300.0 feet, and usually between zero and about 250.0 feet.

The lens 310 may help capture images of a vehicle 120 that may have a license plate 115 having license plate data 117. According to the exemplary embodiment illustrated in FIG. 1C, the vehicle 120 may comprise a van but other vehicles 120 are possible and are included within the scope of this disclosure. Other vehicles 120 include, but are not limited to, automobiles, trucks, motorcycles, bicycles, trains, planes, helicopters, etc. The license plate data 117 may comprise data such as numbers, letters, colors, symbols, graphical elements, and/or any combination thereof. According to the exemplary embodiment of FIG. 1C, the license plate data 117 comprises the data of, "ABCD-1234" as its combination of letters and numbers (i.e. "alphanumeric characters").

The camera housing 105 may be coupled to an existing structure 140 by a fastening mechanism 135. The existing structure 140 can be any man-made object such as a utility post or utility tower, like a telephone pole, electrical pole, a water tower, a lamp post, etc. The existing structure 140 may also comprise a building or a bridge. The existing structure 140 may also comprise any nature-based object, such as a natural occurring structure like a tree, a cliff, or a hill. The fastening mechanism 135 may comprise one or any combination of fastening devices such as, but not limited to, nuts, bolts, screws, rivets, nails, and/or chemical-based adhesives.

The remote image analyzer 160 may comprise one or more computer servers and/or databases. It should be understood that the term "server" as used in this description may refer to a single server system or multiple systems or multiple servers. One of ordinary skill in the art will appreciate that various server arrangements may be selected depending upon computer architecture design constraints and without departing from the scope of the invention.

The remote image analyzer 160 may review the uploaded images transmitted from the camera system 101A for license plate data. The remote image analyzer 160 may compare the license plate data 117 to other data in its database as well as sending the license plate data to other databases. The remote image analyzer 160 may generate one or more alerts and/or reports based on the license plate data 117 from the uploaded images and any matches that it makes during its machine-based comparisons. The alerts and/or reports may comprise one or more images of license plate data 117 taken from the images as well as optical character recognition data based on the license plate data 117 in addition to, and not limited to, date, time, and camera location associated with the license plate data which was captured.

Referring now to FIG. 2, this figure is a functional block diagram of the hardware and/or software for one exemplary embodiment of the camera system 102A. The camera system 102A may comprise solar cells 205, a solar cell charge controller 210, a main power storage 215, a camera module 305, an antenna 220, a wireless communications device 225, a processor 230, a real-time-clock (RTC) 235, a RTC exclusive power source 240, the illuminating infrared LEDs 245 (described previously in connection with FIG. 1A), and a motion detector 250.

The solar cell charge controller 210, main power storage 215, and camera module 305 are highlighted with a dashed rectangular box 201 to indicate that these elements may reside on the same printed circuit board. Similarly, the wireless communications device 225, the processor 230, the local memory device 330A, the real-time clock 235, RTC exclusive power source 240, illuminating infrared LEDs 245, and motion detector 250 are highlighted with different rectangular box 203 to indicate that these elements may reside on a single printed circuit board (PCB). However, other electronic packaging layouts/physical configurations are possible and are included within the scope of this disclosure.

The solar cells 205 may be coupled to the solar cell charge controller 210 via a cable 207. The solar cells are usually not mounted to the housing 105 itself, but can be mounted to an existing structure 140 described above. The solar cells 205 may comprise photovoltaic solar cells for converting sunlight into electrical current. The solar cells 205 may be designed to produce approximately between about 15.0 Watts to about 40.0 Watts of power based on traffic activity and/or solar conditions.

The solar cell charge controller 210 may comprise a processor for managing the storage of the electricity produced by the solar cells 205. The solar cell charge controller 210 may be coupled to the main power storage 215. The solar cell charge controller 210 may intelligently manage the main power storage 215 by monitoring its total power capacity and making sure that the main power storage 215 does not receive energy that exceeds it total power capacity (i.e. such as electrical current when the main power storage 215 comprises a re-chargeable battery).

The main power storage 215 may comprise one or more re-chargeable batteries. According to one exemplary embodiment the main power storage 215 may comprise re-chargeable, lithium-ion batteries. However, other power storage devices 215 are possible and are within the scope of this disclosure. Other power storage devices 215 may include capacitors, capacitors combined with batteries, etc.

The main power storage 215 may supply of voltage between about 11.0 Volts to about 13.0 Volts, and preferably about 12.0 Volts of electrical power. While the exemplary embodiment of the camera system 101A illustrated in FIG. 2 is designed for generating its own power through solar energy, other energy sources may be provided in addition to solar energy or as an alternative to solar energy. Other energy sources include wind power, hydro-power, as well as a power line from an electrical grid.

The main power storage 215 may be coupled to the camera module 305, the motion detector 250, the illuminating infrared LEDs 245, and to the processor 230 for supplying power to these elements. The camera module 305, the motion detector 250, and illuminating infrared LEDs 245 have been enclosed by box 209 to illustrate that these three elements work together while the main processor 230 is sleeping or in its stand-by/low power mode.

The camera module 305 has the lens 310 (described above in connection with FIG. 1C) which helps in generating and capturing the images of the license plate 115 described above in connection with FIG. 1C. Further details of the camera module 305 will be described below in connection with FIG. 3.

The main power storage 215 may supply power to the processor 230 when it is woken from a deep sleep cycle. The main power storage 215 may also supply power to the motion detector 250. The motion detector 250 is responsible for detecting objects 120 within the field of view 130 (See FIG. 1C) produced by the lens 310 and then triggering the camera module 305 to take several pictures/images of the detected object 120.

The motion detector 250 may comprise a passive infrared (PIR) sensor. The motion detector may detect PIR light in the range between about 850.0 nanometers and 960.0 nanometers. The motion detector 250 senses heat fluctuations caused by moving objects 120. In other exemplary embodiments, the motion detector 250 may comprise a microwave, ultrasonic, or tomographic sensors or any combination thereof.

The motion detector 250 triggers the camera module 305 to take one or more pictures/images of an object 120 that has been detected. The camera module 305 usually takes several images of the detected object 120 which is within the field of view 130. The camera module 305 may turn on the illuminating infrared LEDs 245 if the time of day [i.e. lighting conditions] and/or weather conditions [i.e. rain, snow, etc.] were determined by the remote image analyzer 160 and sent to the processor 230. The processor 230, when it wakes from its sleep cycle, may send to the camera module 305 control information/conditions for illuminating/activating infrared LEDs 245.

While the camera module 305 is taking one or more images of detected objects 120 within its field of view 130, the processor 230 may be in a deep sleep cycle. As noted previously, at least one advantage of the inventive camera system 101 is that it can operate with very low power. And to accomplish this objective of low power, the processor 230 is designed to enter into multiple deep sleep cycles throughout the operation of the system 101 such that the processor 230 consumes very little power while it is in its sleep cycle.

When the processor 230 is woken from its deep sleep cycle, it is designed to review the images captured by the camera module 305 and to determine if the images 305 are significant or noteworthy enough to upload over the computer communications network 150 to the remote image analyzer 160 (See FIG. 1C). This intelligent screening/filtering of images by the processor 230 is yet another advantage of the inventive camera system 101A.

Specifically, when processor 230 wakes and reviews the captured images, it will also make note of the "quality" of the images, including but not limited to brightness, blurriness, etc. The processor 230 may use well known techniques to determine these quality values. If the images are not of sufficient quality, the processor 230 will send a message containing a recommended adjustment of camera settings that is recorded in the camera module's memory device 330B. This settings message created by the processor 230 may include, but is not limited to, the following: the current time as kept by the RTC 235; if the camera module 305 turn on the infrared illuminating LEDs 245 when capturing images for the current conditions; what shutter speed should be used; and what ISO to use when capturing images.

This intelligent screening/filtering by the processor 230 may comprise the processor 230 applying a neural network based algorithm, and specifically, a recurrent convolutional neural network (RCNN) or a you-look-only-once (YOLO) neural network algorithm. The neural network algorithms may be applied by the processor 230 in order to detect objects 120 within the images and to assign confidence scores to objects 120 (i.e. rank objects) that are detected.

Further details of the processor 230 applying a neural network algorithm will be described below in connection with FIG. 5.

The processor 230 may execute the neural network algorithms in software and/or hardware. The software containing the neural network algorithms may be stored in a local memory device 330A and/or a memory device 330B associated with the camera module 305 (See FIG. 3). The memory devices 330 may comprise flash memory, double-data rate (DDR) memory, and/or any types of non-volatile memory. However, volatile memory types may be employed without departing from this disclosure. Additionally, a combination of volatile and non-volatile memory types may also be employed as understood by one of ordinary skill in the art.

With this intelligent screening and/or filtering of images by the processor 230, the processor 230 is selective for which images are uploaded to the remote image analyzer 160. And when the processor 230 is selective for the images which are captured, this reduces the amount of images which are uploaded to the remote image analyzer 160. Therefore, this reduction of the transmission of images over the communications network 150 significantly reduces power consumption of the entire camera system 101A because the wireless communications device 225 is activated only minimally.

As one illustration of the power savings provided by the inventive camera system 101A, the camera module 305 may consume about 10.0 milliamps of power when it is capturing images of an object 120. Meanwhile, during a powering-up segment for the processor 230, the processor 230 while it is reviewing images taken and stored in the camera module 305 may consume about 100.0 milliamps of power.

When the processor 230 has filtered the images captured by the camera module 305 and is ready to transmit the images which have survived the filter, then the wireless communications device 225 in combination with the antenna 220 may consume about 400.0 milliamps of power per transmission. Thus, with the processor 230 reducing the number of images transmitted to the remote image analyzer 160, it may significantly reduce the amount of power consumed by the system 101A by only operating the wireless communications device 225 only minimally.

The processor 230 may be coupled to the wireless communications device 225 and to a real-time-clock 235. The wireless communications device 230 may comprise a radio-frequency transceiver with a modem for communicating with a cellular telephone network. Other wireless communications devices 230 besides radio-frequency (RF) types may be employed without departing from the scope of this disclosure. Other wireless communications devices 230 include, but are not limited to, acoustic communication devices, optical/infrared based communications devices, and electromagnetic induction type communication devices.

In addition to the wireless communication device 230, the processor 230 may be coupled to a real-time-clock 235. The real-time-clock 235 provides the processor 230 with the time of day, day of month, and year for the processor 230. The RTC 235 is employed such that the processor 230 may enter into a deep sleep cycle so that it is not dependent on its own internal clock(s) which may become idle and/or unused during a sleep cycle. The RTC 235 may also provide its time data to the camera module 305 [via the processor 230] so that the camera module 305 may date stamp each of the images that it captures for objects 120.

The RTC 235 may be coupled to an exclusive power source 240 which is designed to supply energy only to the RTC 235. According to one exemplary embodiment, the RTC exclusive power source 240 may comprise a battery. For example, the battery may be a coin-sized battery cell. The battery may supply power to the RTC 235 on the order of years, such as between 5.0 and 10.0 years.

As noted previously, the illuminating infrared light emitting diodes (LEDs) 245 may generate a second field of view 132 within the first field of view 130 (See FIG. 1C). The illuminating infrared LEDs 245, as described above, may generate the second field of view 132 within the first field of view 130 in order to illuminate reflective objects 120 that include license plates 115. The illuminating infrared LEDs 245 are often used by the camera system 101 when image conditions may not be ideal, such as during darkness and/or during inclement weather (i.e. during rain, snow, etc.) when visibility is poor.

The second field of view 132 produced by the illuminating infrared LEDs 245 generally has a magnitude which is less than the first field of view 130. The second field of view 132 may have a magnitude between about 5.0 degrees to about 15.0 degrees, and preferably about 10.0 degrees. However, other magnitudes for the second field of view 132 are possible and are within the scope of this disclosure as understood by one of ordinary skill in the art. The distance or range for the illuminating infrared LEDs 245 may comprise a magnitude between about zero to about 300.0 feet, and usually between zero and about 250.0 feet.

Figure 3:
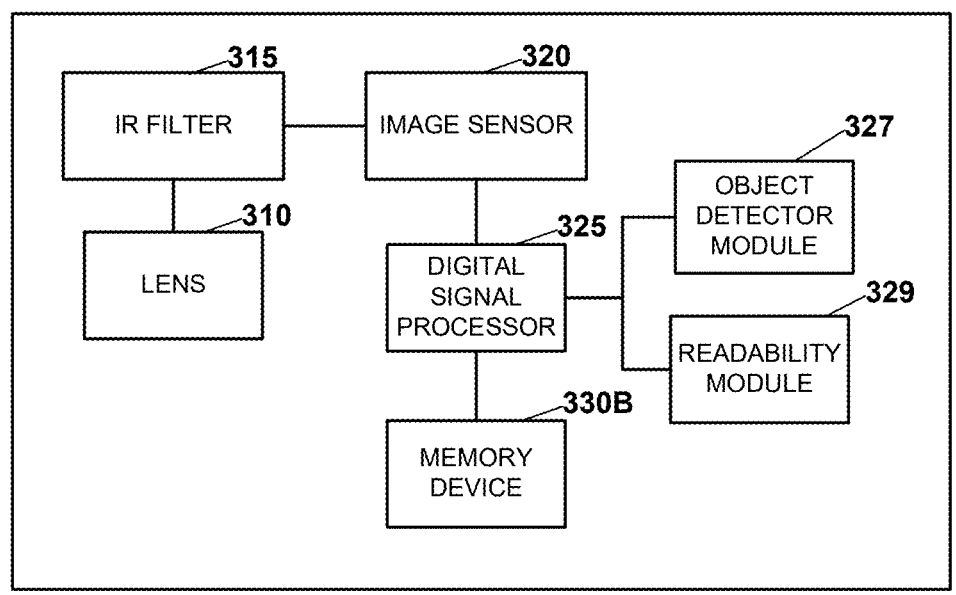
FIG. 3 is a functional block diagram of one exemplary embodiment of a camera module that is one component of the exemplary camera system of FIG. 2.

Referring now to FIG. 3, this figure is a functional block diagram of one exemplary embodiment of a camera module 305 that is one component of the exemplary camera system 101A of FIG. 2. The camera module 305 may comprise a lens 310, a filter 315, an image sensor 320, a digital signal processor 325, and a memory device 330B. As noted previously, the memory device 330B may comprise a DDR type memory device. However, other memory devices 330 are possible and are within the scope of the disclosure.

The lens 310 creates a visual focus and the first field of view 130 (See FIG. 1C) for the image sensor 320. The filter 315 may comprise an infrared (IR) filter for removing/filtering an infrared light received in the image. As noted previously, the camera module 305 and/or processor 230 may activate one or more illuminating infrared LEDs 245 for bouncing infrared light off a detected object 120 within the second field of view 132. Such activation of the illuminating infrared LEDs 245 may be helpful when image capturing conditions are not ideal (i.e. during inclement weather such as during rain or snow and/or when the time of day is at night and there is very little or no natural light to illuminate any detected objects 120).

Also, as noted above, most license plates 115 as of this writing are designed to be very reflective in response to infrared light in order to enhance digital image capture of license plates 115. The filter 315 allows the camera module 305 to capture full color images during the daytime. The DSP 325 may keep the filter 315 "off" at nighttime so that it can pass through any infrared light generated by illuminating infrared LEDs 245, i.e. so that the reflection of a license plate 115 generated by the infrared light is more visible in the captured image.

The image sensor 320 may comprise a semiconductor charge-coupled device (CCD), a complementary metal-oxide-semiconductor (CMOS), or N-type metal-oxide-semiconductor (NMOS, Live MOS) type of sensor. The image sensor 320 may be coupled to a digital signal processor (DSP) 325. Alternatively, a field gate programmable array (FPGA) may be employed instead of the DSP 325. The DSP 325 may adjust any one of the numerous settings for the image sensor 320. Exemplary settings for the image sensor 320 may include, but are not limited to, exposure [light meter]; aperture; shutter speed; ISO [exposure index rating]; white balance; amount of infrared light provided by the illuminating infrared LEDs 245; and depth of field.

The DSP 325 may retrieve and store the digital images produced by the image sensor 320 in the memory device 330B. Like the main processor 230 described above, the DSP 325 may also perform some filtering of the images generated by the image sensor 320. The DSP 325 may filter images by removing duplicate images that do not show significant differences between one image to the next.

Specifically, the DSP 325 may remove/delete duplicate images of an object 120 when multiple images present very similar information/views of the same object 120. The DSP 325 may compare multiple images taken of a single object 120 and reduce the number of images taken if the differences from one image to the next in a series of images are not that different.

For example, for a plurality of images, let's suppose ten images, which capture a moving object 120 translating at least 10.0 feet across the field of view 130, the DSP 325 may delete several images such as the second, third, fourth, sixth, seventh, eighth, and ninth images. And thereby, the DSP 325 saves or keeps the first, fifth, and tenth images of the previously ten-image set. In other words, the DSP 325 has reduced a ten image set to a three image set comprising the first, fifth, and tenth images. This reduction of images by the DSP 325 further reduces the image set uploaded to the remote image analyzer which is in addition to the reduction made by the processor 230 employing the neural network algorithm discussed above.

For identifying objects within the field of view 130 of an image, the DSP 325 may run or execute an object detector module 327 illustrated in FIG. 3 (such as described in connection with steps 414, 426 of FIG. 4A described below and other steps of FIG. 4). Similarly, for determining the readability of an object (i.e. the readability of a license plate 115 having alphanumeric characters 117), the DSP 325 may run or execute a readability module 329 illustrated in FIG. 3 (such as described in connection with steps 416, 424 of FIG. 4A described below and other steps of FIG. 4). The object detector module 327 and readability module 329 may comprise logic embodied in hardware, software, and/or firmware, or any combination thereof as understood by one of ordinary skill in the art.

The DSP 325 may store its filtered images in the memory device 330B. As noted previously, the memory device 330B may comprise a DDR type memory device. However, other memory devices 330 are possible and are within the scope of the disclosure. The memory device 330B may have a size which ranges between about 16.0 megabits to about 2.0 gigabytes. The size of the memory device 330B may be selected based on an intended application of the camera system 101. Other sizes larger or smaller for the memory device 330B are possible and are included within the scope of this disclosure.

Figure 4A:
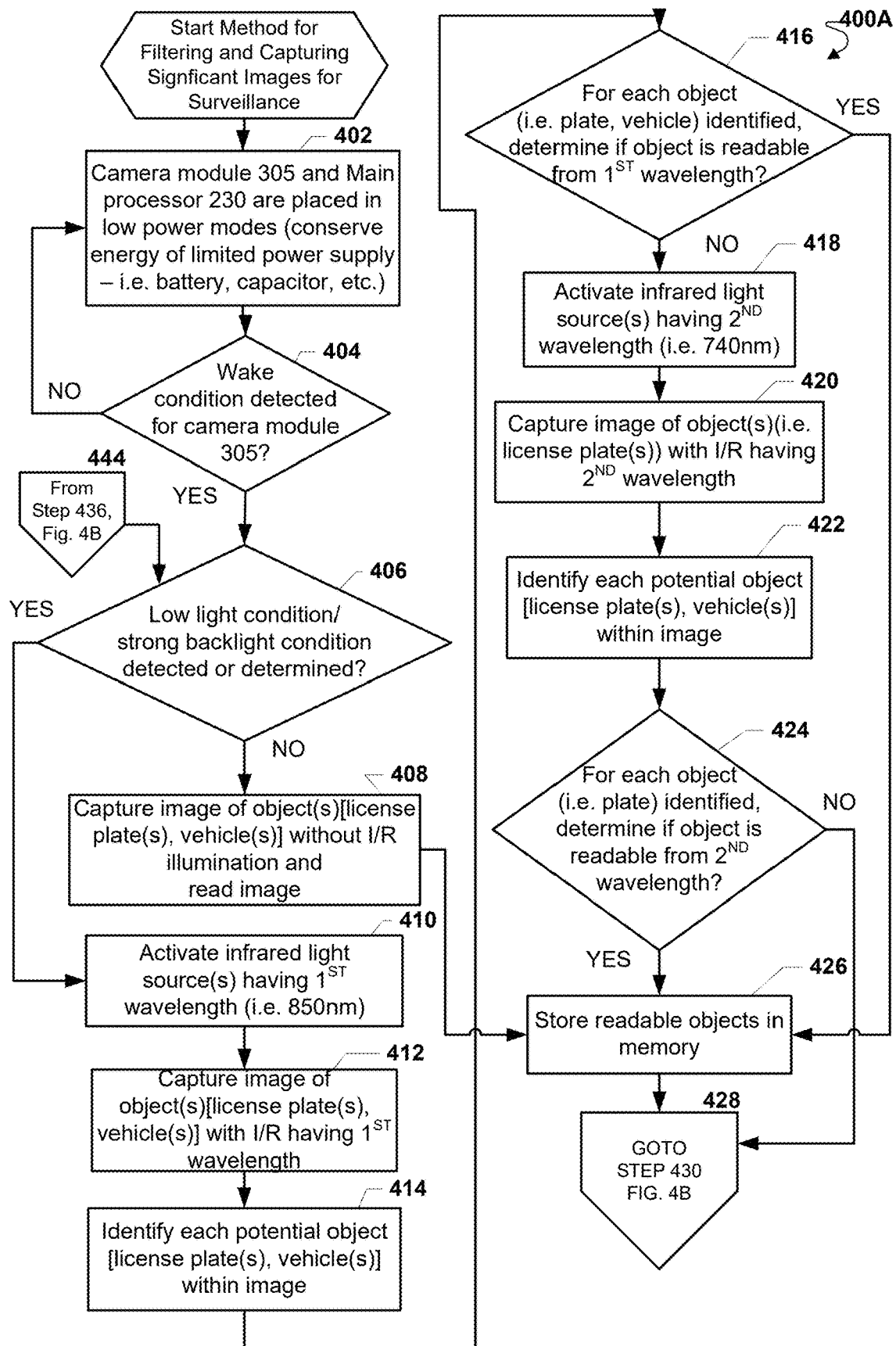
FIG. 4A is a first logical flow chart for an exemplary method for capturing and filtering images using multiple electromagnetic wavelengths (i.e. infrared wavelengths) by the camera system illustrated in FIGS. 1-3.

Referring now to FIG. 4A, this figure is a first logical flow chart 400A for an exemplary method 400 for capturing and filtering images using multiple electromagnetic wavelengths by the camera system 101 illustrated in FIGS. 1-3. Step 402 is the first step of the process 400 in which the camera module 305 may be placed in a "stand by" low power mode while the main processor 230 of FIG. 2 is placed in a deep sleep mode. Each of these two power modes may conserve energy for the limited power supply or main power storage 215 for the system 101.

As noted previously, the system 101 is designed where the power supply 215 is limited (i.e. it comprises a battery, a capacitor, or a combination thereof). If the system 101 is coupled to an unlimited power supply 215, such as to an electrical power grid, then many of the steps described below may be modified when power conservation is not needed.

In decision step 404, it is determined if a wake condition for the camera module 305 is detected. In this decision step 404, the camera module 305 may receive a signal from a motion detector/sensor 250. Alternatively, in this step 404, the camera module 305 may receive a signal from the communications network 150 (i.e. a signal generated from a different camera system 101 or a signal generated from a control network) to "wake-up." Or in this step 404, the camera module 305 may be taken out of its stand-by mode according to a rule, which may use a certain amount of elapsed time to trigger the camera module 305 to be taken out of its stand-by mode.

If the inquiry to decision step 404 is positive, then the "Yes" branch is followed to decision step 406. If the inquiry to decision step 404 is negative, then the "No" branch is followed back to step 402 where the camera module 305 is allowed to remain in a low power mode (inactive/stand-by state).

In decision step 406, the DSP 325 determines if a low light condition or a strong backlight condition exists based on readings from the image sensor 320. Alternatively and/or additionally, the low light condition or a strong backlight condition could be determined with a rule such as a time of day and/or a weather forecast in addition to the image sensor readings. If the inquiry to decision step 406 is negative, meaning that there is not a low light condition present (i.e. the camera module 305 may be capturing images during daylight, etc.), then the "No" branch is followed to step 408 in which the image sensor 320 captures images of objects, which may include, but are not limited to, license plates 115 and vehicles 120 (i.e. vehicle models) without any infrared (I/R) illumination being emitted from LEDs 245.

If the inquiry to decision step 406 is positive, meaning that a low light condition has been detected (i.e. night time, adverse/inclement weather, or any other condition, or combination of these conditions, causing a low ambient light condition), then the method follows the "Yes" branch to step 410. In step 410, an infrared light source, such as one or more of the LEDs 245, having a first wavelength is activated. This first wavelength may have a magnitude of about 850.0 nm but other wavelengths are possible. Other wavelengths include, but are not limited to, 940.0 nm as well as the entire infrared (I/R) spectrum/range, which falls between about 700.0 nm to about 2500.0 nm.

The first wavelength in step 410 is generally selected such that it is not visible or perceptible by the human eye. Typically, I/R light between about 700.0 nm and about 780.0 nm may be visible by the human eye, especially near or adjacent to the source generating the I/R (i.e. such as I/R light sources 245 of FIGS. 1A & 2). This first wavelength (or a set of more than one wavelengths) may be selected to be invisible to the human eye so that the I/R light sources 245 during step 410 do not attract attention from a human subject (i.e. are not surprising and/or distracting to a human subject) within the field of view of the camera system 101.

Subsequently, in step 412, an image within the field of view of the camera system 101 is captured by the image sensor 320 under control of the DSP 325. During step 412, the DSP 325 stores the image in the memory device 330B of the camera module 305. Next, in step 414, the DSP 325 via the object detector module 327 identifies each potential object within the captured image. Objects may include, but are not limited to, license plates 115, humans 125, and vehicles 120 (i.e. vehicle shapes/body/model types). Further details about step 414 and the object detector module 327 will be described below in connection with step 422, which is similar to step 412.

Subsequently, in decision step 416, for each object identified by the DSP 325 in step 412, the DSP 325 via the readability module 329 determines if the object detected is readable from the first wavelength (i.e. such as about 850.0 nm, when 850.0 nm is selected as the first wavelength). Decision step 416 may include one or more the readability submethods performed by at least the readability module 329 described below.

For example, in this decision step 416, for detected license plate objects 115, the DSP 325 via at least the readability module 329 may measure the contrast between the characters 117 of the license plate 115 and the background color of the license plate 115 and compare the calculated contrast to an acceptable threshold. Specifically, an image of a license plate 115 may be first converted to a grayscale image. A simple way to calculate a plate's contrast is to calculate a low and high percentile of pixel values of the plate 115 and compare their ratio: a 10th percentile and a 90th percentile can be used as exemplary values. Such values may exclude noise affecting the estimation and may directly indicate a reliable average background and character brightness. A ratio of the percentiles may be determined as the contrast value.

Another submethod that may be used during step 416 by the DSP 325 via at least the readability module 329 may evaluate other characteristics in addition to contrast. Other characteristics include, but are not limited to, a frequency and amplitude distribution using a Fast Fourier Transform (FFT) as understood by one of ordinary skill in the art. That is, license plates 115 have known letter sizes and therefore important frequencies for reading a license plate 115 are known to one of ordinary skill in the art. The important frequencies and their accompanying amplitudes can indicate the readability of a license plate 115.

Another submethod for step 416 performed by the DSP 325 via at least the readability module 329 may include a machine learning (ML) model to detect characteristics of license plate objects 115 such as, but not limited to, contrast, optical character recognition (OCR) legibility, or characteristics that indicate that the type of plate 115 matches a known collection of plate types that require lower I/R wavelength illumination (i.e. 740.0 nm that is lower than 850.0 nm). The contrast values, OCR legibility and other characteristics can be simply thresholded to make a judgment whether a lower I/R wavelength (i.e such as 740.0 nm, compared to 850.0 nm) should be used.

Another submethod for decision step 416 performed by the DSP 325 via at least the readability module 329 may include using a machine learning (ML) model. This ML model may detect the characteristics of a vehicle 120 which match that of a prior vehicle 120 containing a license plate 115 previously determined to require 740.0 nm illumination. That is, the ML model may make decisions based on previous captures from this or other camera systems 101 stored locally (within system 101) or from a remote database (i.e. image analyzer 160 of FIG. 1C).

Another submethod for decision step 416 performed by the DSP 325 via at least the readability module 329 may include a prediction head (i.e. an additional output after a backbone network 160) of a machine learning (ML) model. This ML model can be directly trained to provide a probability that the license plate 115 that has been detected by the camera module 305 would benefit from a lower I/R wavelength (i.e. lower 740.0 nm wavelength compared to a higher 850.0 nm wavelength).

If the inquiry to decision step 416 is positive, meaning that the DSP 325 via at least the readability module 329 has determined that the object within the captured image (i.e. license plate 115, vehicle 120, etc.) is readable (i.e. legible for license plate data 117) from the first wavelength, then the "Yes" branch is followed to step 426 in which the DSP 325 stores the readable objects in local memory (i.e. memory 330B of the camera module 305). If the inquiry to decision step 416 is negative, meaning that the DSP 325 via at least the readability module 329 has determined that the object within the captured image (i.e. license plate 115, vehicle 120, etc.) is not readable (i.e. license plate data 117 cannot be read or understood) from the first wavelength, then the "No" branch is followed to step 418.

In step 418, the DSP 325 activates the infrared light source(s) 245 which have a second wavelength different from the first wavelength used in step 410. So if the first wavelength used in step 410 was about 850.0 nm, then the second wavelength used in this step 418 may have a shorter wavelength of about 740.0 nm. As noted previously, typically, I/R light between about 700.0 nm and about 780.0 nm may be visible by the human eye, especially near or adjacent to the source generating the I/R (i.e. such as I/R light sources 245 of FIGS. 1A & 2).

This first wavelength (or a set of more than one wavelengths) selected in step 410 may be invisible to the human eye so that the I/R light sources 245 during step 410 do not attract attention from a human subject (i.e. are not surprising and/or distracting to a human subject) within the field of view of the camera system 101. Meanwhile, for I/R wavelengths less than about 780.0 nm, usually selected for step 418, may be perceivable/visible to the human eye. However, such lower I/R wavelengths emitted by light sources 245 may provide for better contrast values calculated in decision step 416 and decision step 424 described below.

As noted above, the first wavelength or set of first wavelengths (i.e. plurality) selected for step 410 are generally different from the second wavelength or set of second wavelengths (i.e. plurality) selected for step 418. Generally, longer wavelengths above 780.0 nm and invisible to the human eye are selected for step 410 (the first wavelength) while shorter wavelengths below 780.0 nm and potentially visible to the human eye are selected for step 418. This means that alternative combinations of wavelengths selected for steps 410 and 418 are possible and are included within the scope of this disclosure as understood by one of ordinary skill in the art.

For example, it is also possible in some scenarios that the first wavelength in step 410 may be the lower wavelength relative to step 418, after the DSP 325 has determined (see step 440 described below) that a majority of prior image captures were more "readable" using a lower wavelength (i.e. lower 740.0 nm wavelength in prior captures provided better results than those at higher 850.0 nm wavelength reads).

This example of using a lower wavelength (i.e. 740.0 nm instead of 850.0 nm) first in step 410 may correspond with a territory/government jurisdiction which uses/requires license plates 115 that have a background color relative to the license plate data 117 that does not provide great contrast between the color of the plate data 117 and the background color of the plate 115 when using I/R light to illuminate a plate 115 and a camera module 305 to read the plate 115 (i.e. black colored plate data 117 may provide better contrast values against a white background color when illuminating a plate 115 with I/R light, compared to black colored plate data 117 presented against a solid blue or solid non-white color, which may provide lower contrast values when illuminating a plate 115 with I/R light).

In other words, the system 101 via method 400 and specifically step 440 (described below) may "learn" that it is located/positioned in a jurisdiction (geolocation) where a majority of license plates 115 have a unique color for both the plate data 117 and the background color for the plate 115. Thus, the system may start with the "optimal" wavelength as its first wavelength in step 410, where this "optimal" wavelength for a majority of plates 115 was discovered from a plurality of prior reads of prior license plates 115 passing by the system 101.

Referring back to step 420, similar to step 412, an image within the field of view of the camera system 101 is captured by the image sensor 320 under control of the DSP 325. During step 412, the DSP 325 stores the captured image in the memory device 330B of the camera module 305. Next, in step 422, like step 414, the DSP 325 via the object detector module 327 identifies each potential object within the captured image. Objects may include, but are not limited to, license plates, humans, and vehicles. Further details about step 422 (as well as similar step 414) and the object detector module 327 will be described in further detail below.

After step 422, in decision step 424 which is similar to decision step 416, for each object identified by the DSP 325 in step 422, the DSP 325 via the readability module 329 determines if the object detected is readable from the second wavelength (i.e. such as 740.0 nm, when 740.0 nm is selected as the second wavelength). Decision step 424, like step 416 may include the same one or more the readability submethods performed by at least the readability module 329 which where described above for decision step 416. The submethods for decision step 416 which were described above will not be described here for brevity.

If the inquiry to decision step 424 is positive, meaning that the DSP 325 via at least the readability module 329 has determined that the object within the captured image (i.e. license plate 115, vehicle 120, etc.) is readable (i.e. legible for license plate data 117) from the second wavelength, then the "Yes" branch is followed to step 426 in which the DSP 325 stores the readable images in local memory (i.e. memory 330B of the camera module 305). If the inquiry to decision step 424 is negative, meaning that the DSP 325 via at least the readability module 329 has determined that the object within the captured image (i.e. license plate 115, vehicle 120, etc.) is not readable (i.e. license plate data 117 cannot be read or understood) from the second wavelength, then the "No" branch is followed to step 428.

Figure 4B:
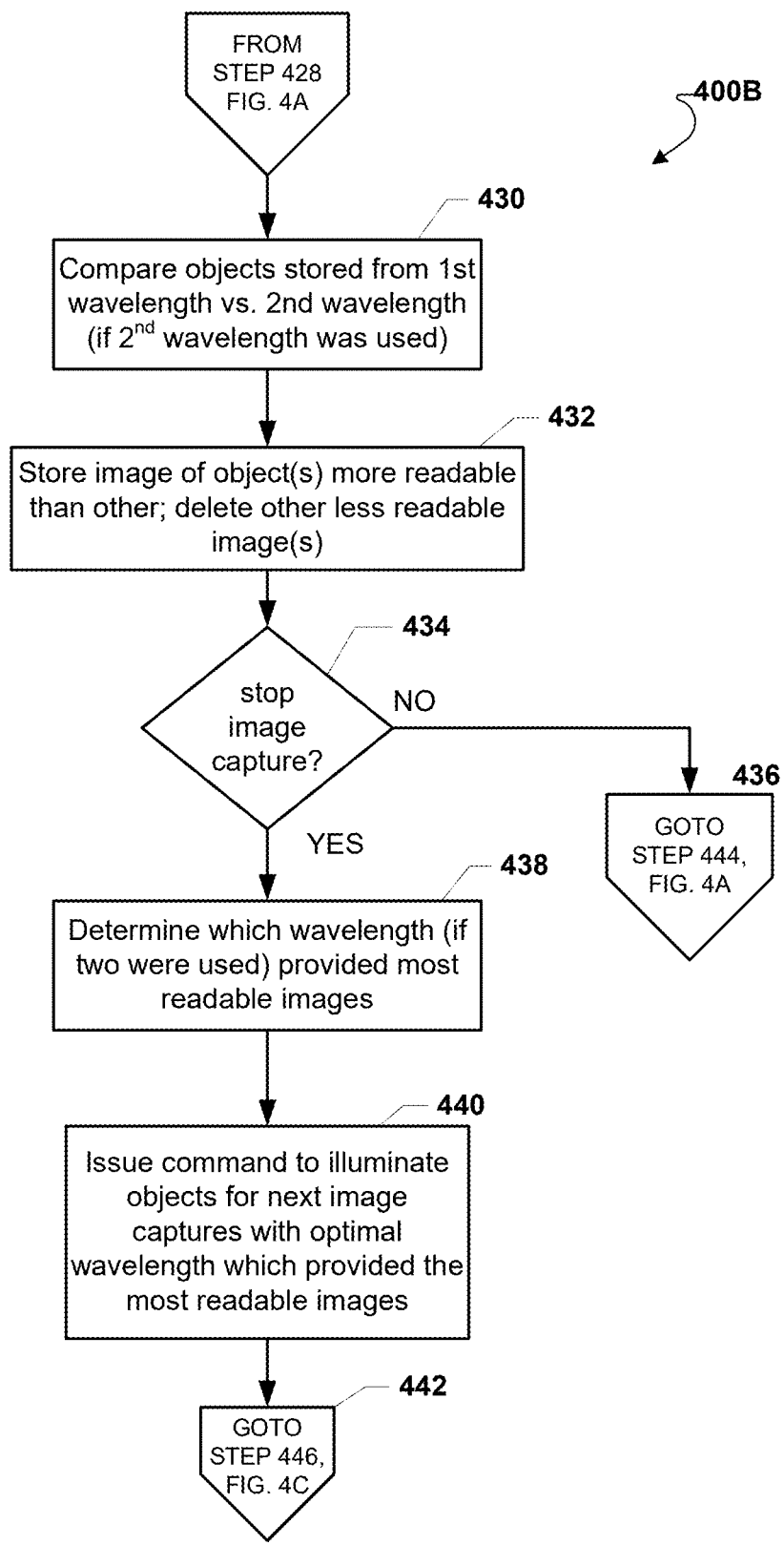
FIG. 4B is a second logical flow chart of the exemplary method for capturing and filtering images using multiple electromagnetic wavelengths by the camera system illustrated in FIGS. 1-3.

After the readable objects are stored in local memory 330B of the camera module in step 426, the method 400 continues to step 428 in which the method proceeds to step 430 of illustrated in FIG. 4B. Referring now to FIG. 4B, this figure illustrates a second logical flow chart 400B of the exemplary method 400 for capturing and filtering images using multiple electromagnetic wavelengths by the camera system 101 illustrated in FIGS. 1-3.

Step 430 of FIG. 4B continues from step 428 of FIG. 4A, described above. In step 430, the DSP 325 via the readability module 329 compares the detected objects stored based on first wavelength with the detected objects based on the second wavelength. In this step, the DSP 325 may compare the contrast values (and/or other values calculated) from decision steps 416 and 424 to determine which detected object and corresponding wavelength provided the better "readability" of the object (i.e. which image of the license plate data 117 is more readable from the first or second wavelength used to illuminate the license plate 115). The DSP 325 in this step 430 may assign a readability value/number to each object: the higher the value/number, the "more" readable the object.

Next, in step 432, the DSP 325 based on the comparison performed in step 430, may store/retain the objects determined in step 430 to have a higher "readability" value compared to those objects determined in step 430 to have a lower "readability" value. And for those objects that have a lower "readability" value, the DSP 325 may delete those images having those objects with the lower "readability" value.

Subsequently, in decision step 434, it may be determined if the process of capturing images with the image sensor 320 of the camera module 305 should be stopped. Similar to step 404 of FIG. 4A involving the wake condition, in this decision step 434, the camera module 305 may stop receiving a signal from a motion detector/sensor 250. Alternatively, in this step 434, the camera module 305 may receive a signal from the communications network 150 (i.e. a signal generated from a different camera system 101 or a signal generated from a control network) to be placed in a "stand-by" or low power mode. Or in this decision step 434, the camera module 305 may be placed into its stand-by mode according to a rule, which may use a certain amount of elapsed time to put the camera module 305 back into its stand-by mode.

If the inquiry to decision step 434 is positive, meaning that the camera module 305 should stop capturing images, then the method follows the "Yes" branch to step 438. If the inquiry to decision step 434 is negative, meaning that the camera module 305 should continue capturing images, then the method follows the "No" branch to step 436 in which the method returns to step 444 of FIG. 4A, where the camera module determines if low lighting conditions are present for capturing images.

In step 438, the DSP 325 may determine which wavelength (if at least two were used in the prior steps) provided the most readable images. Next, in step 440, the DSP 325 may issue a command to illuminate objects for subsequent/future image captures with the "optimal" wavelength which provided the most readable objects/images from prior reads. This means that the DSP 325 may start with an "optimal" wavelength as the first wavelength in step 410. This step 440 was characterized above as where the system 101 "learns" the "optimal" wavelength for the majority of license plates 115 that may be passing by the system 101 (i.e. the system 101 is positioned for a period of time in the same geolocation/same territory/same jurisdiction which requires certain types of plates 115 having a specific color for the plate data 117 and background color of the plate 115).

In other words, as noted above, this example of using an optimal wavelength, which could be a lower wavelength (i.e. 740.0 nm instead of 850.0 nm) used first in step 410 may correspond with a territory/government jurisdiction which uses/requires license plates 115 that have a background color relative to the license plate data 117 that does not provide great contrast between the color of the plate data 117 and the background color of the plate 115 (i.e. black colored plate data 117 may provide better contrast values against a white background color, compared to black colored plate data 117 presented against a solid blue or solid non-white color, which may provide lower contrast values). Thus, after step 440, the system 101 has "learned" the coloring scheme of the majority of license plates 115 which may be passing by the system 101. Subsequently, after step 440, the method 400 proceeds to step 442.

Figure 4C:
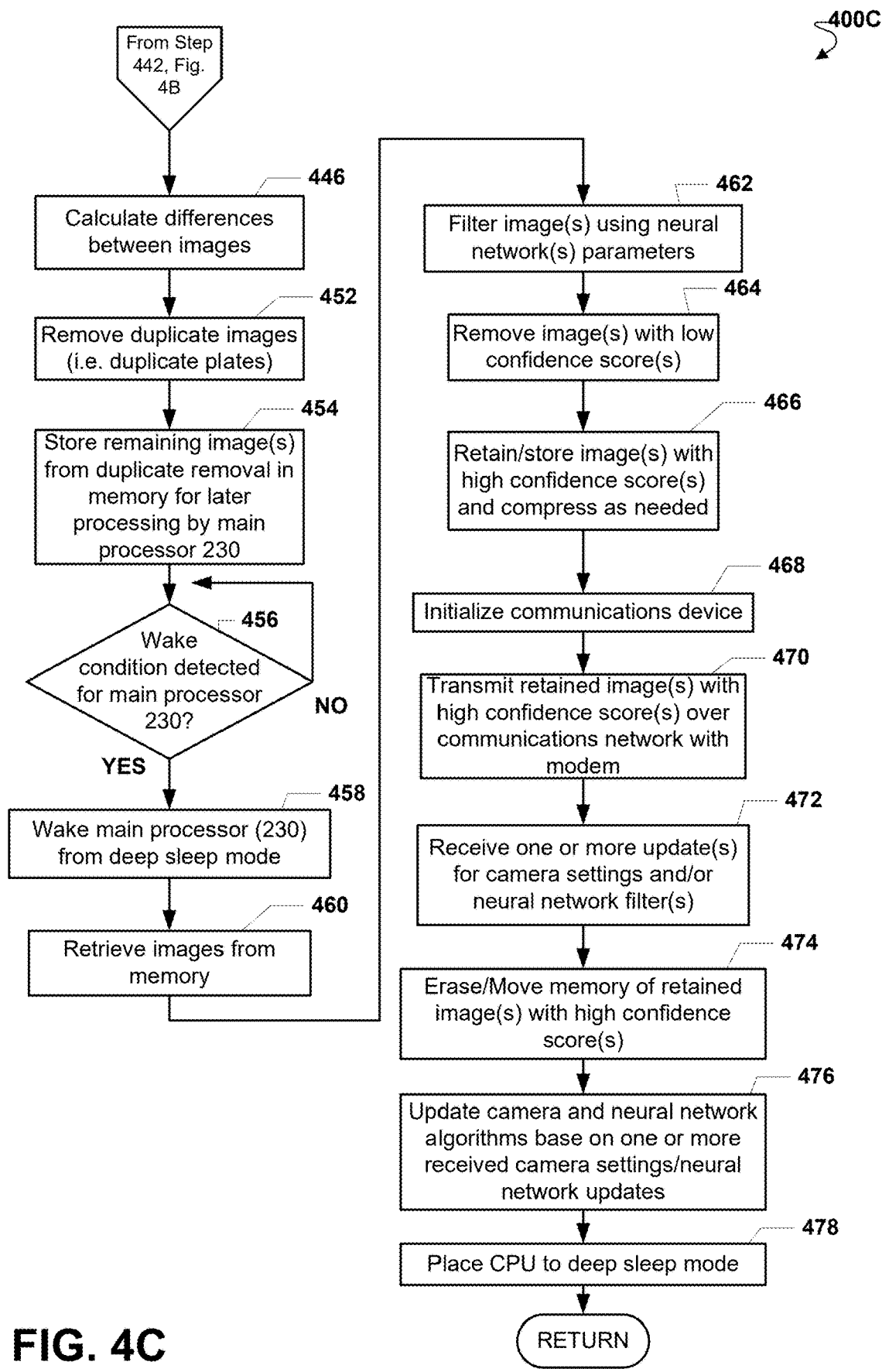
FIG. 4C illustrates a third logical flow chart of the exemplary method for capturing and filtering images using multiple electromagnetic wavelengths by the camera system illustrated in FIGS. 1-3.

In step 442, the method 400 may then continue to step 446 of FIG. 4C. Referring now to FIG. 4C, this figure illustrates a third logical flow chart 400C of the exemplary method 400 for capturing and filtering images using multiple electromagnetic wavelengths by the camera system 101 illustrated in FIGS. 1-3.

Step 446 continues from step 442 of FIG. 4B. In step 446, after all images have been captured for the motion event, the DSP 325 compares the images taken for the motion event. The DSP 325 calculates any differences between the images taken for the motion event. In step 452, the DSP 325 may remove duplicate images of the same object (i.e. plates 115, vehicles 120, etc.). As noted previously, the DSP 325 may remove/delete duplicate images of an object when multiple images present/show very similar information/views of the same object. The DSP 325 may compare multiple images taken of a single object 120 and reduce the number of images taken if the differences from one image to the next in a series of images are not that different.

For example, for a plurality of images, let's suppose ten images, which capture a moving object translating at least 10.0 feet across the field of view 130, the DSP 325 may delete several images such as the second, third, fourth, sixth, seventh, eighth, and ninth images. And thereby, the DSP 325 saves or keeps the first, fifth, and tenth images of the previously ten-image set. In other words, the DSP 325 has reduced a ten image set to a three image set comprising the first, fifth, and tenth images. This reduction of images by the DSP 325 further reduces the image set uploaded to the remote image analyzer 160 which is in addition to the reduction made by the processor 230 employing the neural network algorithm which will be in step 462 (described below).

In step 454, the DSP 325 may store the remaining image(s) of the object(s) from the duplicate removal subprocess in the memory device 330B of the camera module 305 for later processing/filtering by the main processor 230. Next, in decision step 456, it is determined if the memory device 330B has reached its capacity for storing images of objects and/or if a predetermined period/threshold of time has expired.

As noted previously, the memory device 330B may have a size which is selectable and/or based on its application/intended environment. If the memory device 330B is sized to capture about fifty to a hundred images, then decision step 456 can be based on the maximum capacity of the memory device 330B because fifty to one-hundred images may be easily managed by the processor 230 while maintaining the power savings described above.

However, if the memory device 330B is sized to retain on the order of thousands or hundreds of thousands of images of object(s) (i.e. having a capacity in the 1.0 to 2.0 Gigabyte range or above), then setting decision step 456 to activate for the maximum capacity of the memory device 330B is not reasonable/practical since thousands or hundreds of thousands of images of objects(s) would be too taxing on the processor 230 if power savings is an objective. When the memory device 330B is sized with such a large capacity, then decision step 456/triggering event can be based on a fraction or ratio of capacity filled for the memory device 330B.

Alternatively, or in addition to the memory capacity triggering event described above in connection with the memory device 330B, decision step 456 can be programmed to activate after certain periods/lengths of time have expired. For example, exemplary time periods may comprise time periods on the order of five minute, ten minute, fifteen minute, thirty minute, forty-five minute, and hour intervals. Other timing thresholds are possible and are within the scope of this disclosure as understood by one of ordinary skill in the art.

The memory capacity triggering event and/or timing triggering event of decision step 456 may be monitored by the DSP 325. Once the DSP 325 senses the positive condition for decision step 456, the DSP 325 may send a wake-up signal to the main processor 230 as will be described below.

If the inquiry to decision step 456 is negative, meaning that the DSP 325 has detected that the time period set for decision step 456 has not expired and/or that the memory device 330B has not reached capacity (or a ratio thereof), then the "No" branch is followed back to decision step 456. If the inquiry to decision step 456 is positive, meaning that the DSP 325 has detected that either the time period has expired and/or the memory device 330B has reached its capacity (or designated ratio thereof), then the "Yes" branch is followed to step 458 in which the DSP 325 sends a wake signal to the main processor 230 to "wake-up" from its deep sleep cycle/low-power mode.

Next, in step 460, the processor 230 retrieves the image(s) of the object(s) from the memory device 330B. Subsequently, in step 462, the processor 230 filters the images using a neural network based algorithm, and specifically, a recurrent convolutional neural network (RCNN) or a you-look-only-once (YOLO) neural network algorithm. The neural network algorithms may be applied by the processor 230 in order to detect objects 120 within the images and to assign confidence scores to objects (i.e. rank objects such as plates 115 and/or vehicles 120) that are detected Specifically, the neural network is trained for object detection, a technique in which an image is inputted. And then a series of calculations occurs, and a list of predictions are outputted. These predictions may include the class name, i.e. what the object is, a confidence percentage, and a list of coordinates detailing a bounding box of where the object is located/positioned in the image. The specific sequence of calculations performed on the captured image (known as the "graph") can include but is not limited to popular graphs such as Faster-RCNN and YOLO, as noted above. The specific values to use in the calculations (known as the "weights") are determined by training the desired graph with the remote image analyzer 160 (see FIG. 1C) using a substantial dataset of images. Such a dataset may also be acquired from open source datasets such as COCO or ImageNet and/or using images uploaded to the Remote Image Analyzer 160.

Next, in step 464, the processor 230 removes/deletes images from the memory device 330B which have low confidence scores based on the neural network filtering of step 462. Alternatively, instead of removing/deleting the low confidence score images, the processor 230 may set a flag/designate low confidence score images for retention only and not for uploading. This means that the processor 230 may keep all images in the memory device 330B but only designate certain ones, images with high confidence scores based on the neural network filtering, for uploading over the communications network 150 to the remote image analyzer 160.

Subsequently, in step 466, the processor 230 may retain/store those images with high confidence scores in the memory device 330B. The processor 230 may also compress some or all of the retained images having high confidence scores. The processor may also keep uncompressed images with high confidence scores in memory device 330B. Alternatively, if all images are retained by the processor 230, in this step 466, the processor 230 may designate/turn-on a flag for each high confidence image (and compressed) for uploading to the remote image analyze 160.

In step 468, the processor 230 may power-up/activate the wireless communications device 225 which may comprise an RF modem. Next, in step 470, the processor 230 using the communications device 225 may transmit the retained/designated high-confidence score image(s) over the communications network 150 to the remote image analyzer 160.

Subsequently, in step 472, the processor 230 may receive updates for camera settings and/or updates from the remote image analyzer 160 for the neural network filters (i.e. adjusted weighting for each RCNN) of the camera system 101. The camera settings may comprise anyone of a number of camera settings, such as, but not limited to, focal length; exposure [light meter]; aperture; sensor size; focus distance; shutter speed; ISO [exposure index rating]; white balance; amount of infrared light provided by the illuminating infrared LEDs 245.

The camera settings received by the processor 230 in this step 472 may be generated by the remote image analyzer 160 after it has reviewed several of images uploaded by the camera system 101. Alternatively, or additionally, the processor 230 may also generate one or more of these settings based on its analysis of the images selected for upload.

The remote image analyzer 160 and/or main processor 230 may determine optimal camera settings for the camera system 101 based on time of day, based on time of year (i.e. what day of the month to account for amounts of sunlight and weather conditions based on time of year—spring, summer, fall, winter), and based on its geolocation (i.e. the jurisdiction/territory in which the system 101 resides and what are the features/colors of the "majority" of license plates 115 within that jurisdiction/territory).

The remote image analyzer 160 and/or main processor 230 may also determine improved and optimal weightings for the neural network diagrams/algorithms executed by the processor 230. The remote image analyzer 160 and/or main processor 230 may have its own RCNN neural network algorithms and it may determine improved weightings based on comparisons of images taken by the camera system over periods of time (i.e. after days, weeks, months, and years).

As discussed above, the remote image analyzer 160 and/or main processor 230 may also generate one or more alerts and/or reports based on the license plate data 117 from the uploaded images and any matches that it makes during its machine-based comparisons. The alerts and/or reports may comprise one or more images of license plate data 117 taken from the images as well as optical character recognition data based on the license plate data 117 in addition to, and not limited to, date, time, and camera location associated with the license plate data which was captured.

Next, in step 474, the processor 230 may erase the images with the high confidence scores in order to conserve memory. Alternatively, the processor 230 may change a flag status of the images with the high confidence scores so they are stored in a different part of the memory device 330B and/or for certain period of time. If the processor 230 generates compressed images having high confidence scores as well as uncompressed versions, then in this step 474 the processor 230 could delete/erase the compressed versions while retaining the uncompressed versions for a certain period of time (i.e. for a week, month, or several months).

Subsequently, in step 476, the main processor 230 may transmit the updated camera settings to the image sensor 320 and update its neural network algorithms, and specifically its weightings such as for RCNNs, stored in its local memory device 330A based on the weighting updates the processor 230 received from the remote image analyzer 160 in step 472. Next, in step 478, the processor 230 is then placed in its deep sleep cycle/low power mode. The method or process 400 then returns (i.e. returns back to step 402 of FIG. 4A).

Referring back to steps 414 and 422 of FIG. 4A, these object detection steps are performed by the DSP 325 via the object detector module 327 of FIG. 3. Steps 414 and 422 identify each potential object (i.e. vehicle 120, person 125, and/or plate 115) within a captured image. The DSP 325 and/or the object detector module 325 may include a machine learning (ML) model. The ML model may be trained to detect and localize license plates 115 (as well as other objects, such as vehicles 120 and/or people 125).

Alternatively, the DSP 325 and/or the object detector module 325 may include classical machine vision algorithms that scan the image looks for certain geometries or other characteristics that represent a license plate 115. One classical machine vision algorithm for finding a license plate 115 within an image capture may include template matching where the algorithm contains geometries of typical license plates 115 as prior information, i.e. templates. The cross-correlation between the image data and the templates may provide the locations of the highest probabilities of the license plates 115 inside the image area.

Another classical machine vision algorithm for the DSP 325 and/or the object detector module 325 may include cascaded image processing where the first step is an edge detection filter, such as a Sobel filter. The filter can be used to convert the image to a binary or grayscale edge image. Applying a Hough transform for such an image gives all straight edges in it. After the transform, the algorithm can search for all rectangle segments closed by the detected lines and select the most likely candidates as license plates. The selection criteria can include e.g. a segment size, skew and aspect ratio of the detected rectangle.

For each license plate 115 detected in either step 414 and 422, with the location and boundaries of the license plate 115 now determined, the DSP 325 via the object detector module 327 may crop the image or select only that section of the image for further processing and/or storage.

Figure 5:
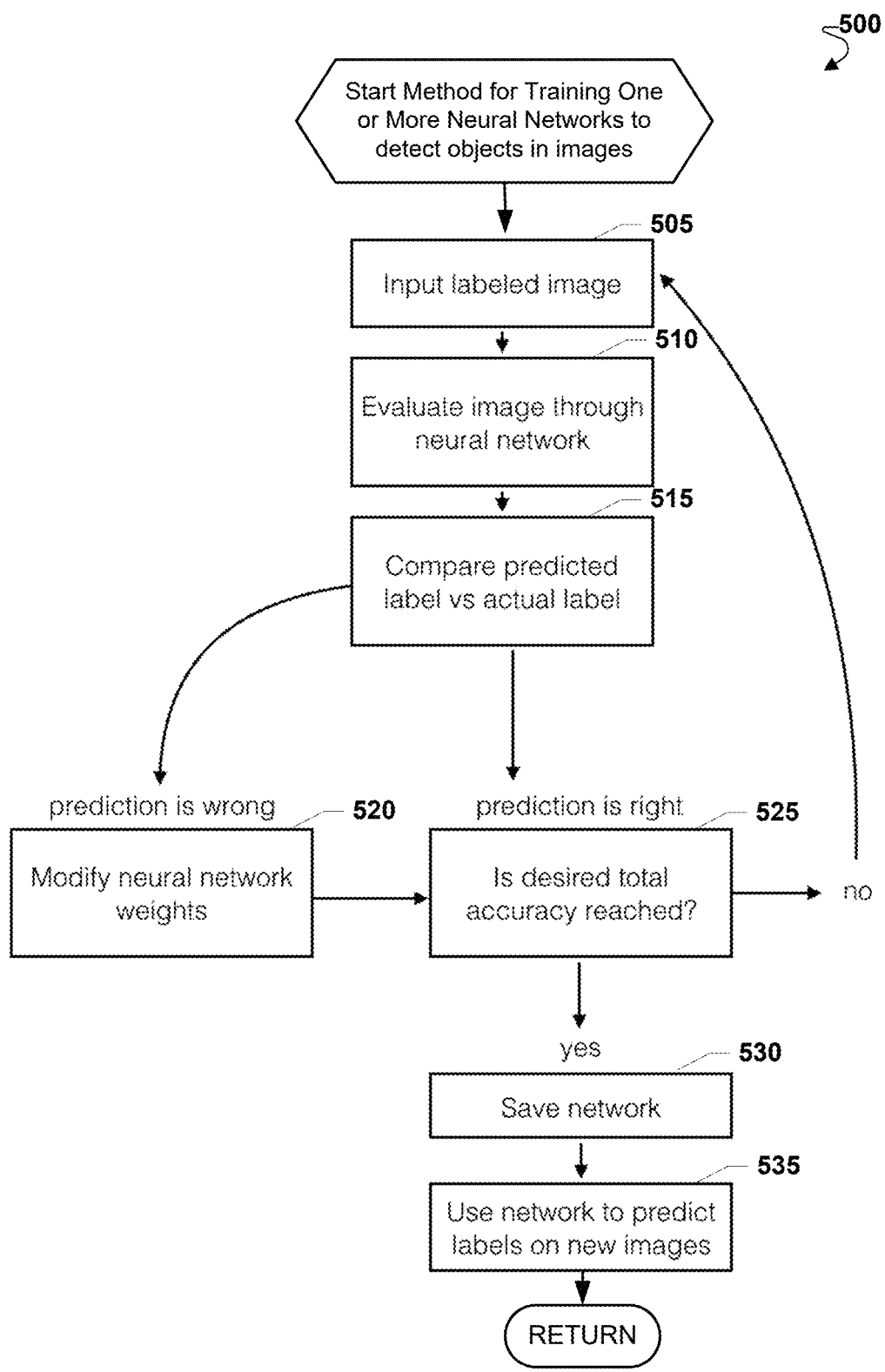
FIG. 5 is a logical flow chart for a method that trains a neural network to detect objects in images.

Referring now to FIG. 5, this figure is a logical flow chart for a method 500 for training a neural network to detect objects in images. This method is usually performed by the remote image analyzer 160. Once the method is complete, the remote image analyzer 160 may send the calculated weights for the one or more neural networks [acting as filter(s)] to the processor 230 of the camera system 101.

One goal of the machine-based object detection method 500 as illustrated in FIG. 5 is to be able to input an image (Step 505) and output a label of the objects in that image (e.g. car, dog, etc.) (Step 535). A common technique for creating an object detection system is to train one or more convolutional neural networks via machine learning, where the model's accuracy is improved by being provided examples of correct results.

To accomplish this, a dataset must first be compiled with example images where the objects in the image are labeled prior to training (Step 505). All objects that are desired to be detected must be known and incorporated into the model and example data beforehand. Many existing datasets are available for use, such as COCO and Open Images; otherwise, one may label his/her own images. For training, it is recommended to have at least 50,000 images of each object to be detected.

With this dataset in hand, a convolutional neural network may be trained to learn how to correctly detect objects in an image. As understood by one of ordinary skill in the art, a neural network usually includes a graph of matrix operations where some matrices have adjustable variables (i.e. weights). One goal of the training process is to be able to adjust these weights so that certain input values (i.e. images) result in certain output values (i.e. correct labels). Existing network architectures exist, such as Faster RCNN and YOLO, and are at least two preferred architectures as of this writing.

The training process for a neural network may include inputting labeled images into a network (Step 505), evaluating the image through the neural network (Step 510), and comparing the predicted label generated by the neural network with the actual label (label made prior to training) (Decision Step 515).

If there is a difference between the expected and actual values (i.e. loss) as calculated in decision Step 515—where the prediction is wrong/off—the method goes to step 520. If there is no difference between the expected and actual value (i.e. no loss), then the method proceeds to Step 525.

In Step 520, the difference between the expected and actual values is calculated and applied to the matrix weights of the neural network such that the loss is reduced for the next iteration of Step 515, improving the accuracy of the neural network. After Step 520, in decision step 525, it is determined if a desired total accuracy of the neural network has been achieved.

If the inquiry to decision Step 525 is positive-meaning that the desired accuracy was achieved in Step 515, then the "Yes" branch is followed to Step 530. If the inquiry to decision Step 525 is negative-meaning that the desired total accuracy based on the comparison in Step 515 has not been achieved, then the "No" branch is followed back to Step 505 wherein the next training image in the training dataset is inputted into the neural network. In Step 630, the network matrix weights are saved. In step 535, the saved network matrix weights may be used to predict labels for objects 146 (i.e. license plates, cars, people, etc.) in new images (not from the training dataset).

This process is then repeated (returned to Step 505) across the entire dataset until the weights begin to converge. A neural network with converged weights provides consistent accuracy across the entire dataset, yielding an object detection model in which you can input a new image and detect the objects in that image with an expected accuracy. Once the neural network achieves a desired, selected accuracy, the remote image analyzer may transmit the saved network matrix weights over the communications network 150 to the camera system 101 so that the one or more neural networks stored within the camera system 101 may be updated.

For a specific neural network training example, see a journal article entitled, "Faster RCNN: Towards Real-Time Object Detection with Region Proposal Networks," authored by Shaoqing Ren et al. found in the electronic Publication eprint arXiv: 1506.01497 and published in June 2015. Particularly, see FIG. 2 of that journal article. One could take the architecture of this neural network of FIG. 2 and implement it in a neural network modeling library such as TensorFlow. Each layer in this FIG. 2 takes an input from the previous layer, does some manipulation of the data, and outputs the new value to the following layer. The specific type of manipulation done depends on the attributes and type of the layer.

For instance, a convolutional layer of a specific size is a set of weights that is convolved across the entire image, producing an activation map for a specific feature across the image. For example, one convolutional layer could be trained to recognize a tire, and one could be trained to recognize a license plate. A subsequent layer may then look at the output of these initial layers and learn that when these features are present, so is a car.

The technique known as back-propagation may be used in order for the system to find the particular weights of a particular feature. In this technique, the layer is convolved across an image, producing a matrix that acts like a heat map, indicating where it believes a specific feature to be located within the image. The system then takes this output and compares it with the expected value (as indicated by the labeled training dataset), and adjusts the weights based on the difference between the expected and the actual output. By using a neural network architecture such as illustrated in FIG. 2 of the aforementioned published journal article along with the technique of back-propagation machine learning, the network is able to learn to identify specific features and their location within an image.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or parallel (substantially simultaneously with) other steps without departing from the scope and spirit of the invention. Further, words such and "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification.

Therefore, disclosure of a particular set of program code instructions or detailed hardware devices is not considered necessary for an adequate understanding of how to make and use the invention. The inventive functionality of the claimed computer implemented process is explained in more detail in the above description and in conjunction with the figures that may illustrate various processes flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM, Flash, or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, Server, or other remote source, such as in "cloud" computing, using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk, and blu-ray disc where disks usually reproduce data magnetically, while discs reproduce data optically with lasers. Combinations of the above should also be included within the scope or computer-readable media.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A computer-implemented system for capturing surveillance images, the computer-implemented system comprising:
   a housing containing a first light source, a second light source, a camera module, and a limited power supply; the limited power supply providing power to each light source and the camera module;
   the first light source for generating infrared light at a first wavelength;
   the second light source for generating infrared light at a second wavelength that is different from the first wavelength;
   the camera module capturing a first image of an object without any activation of the first light source and second light source when the camera module does not detect a low lighting condition or a strong backlight condition; the camera module activating the first light source to capture a first image of the object with the first light source when a low lighting condition or a strong backlight condition is detected by the camera module, the camera module determining if a second image of the object is needed using the second light source; the camera module capturing a second image of the object with the second light source if the camera module determines that the second image of the object is needed, whereby the camera module conserves power for the limited power supply.

2. The system of claim 1, further comprising a motion detector for detecting motion of the object.

3. The system of claim 1, wherein the object comprises a license plate of a vehicle.

4. The system of claim 1, wherein the first wavelength is greater than the second wavelength.

5. The system of claim 4, wherein the first wavelength is between approximately 781.0 nm to approximately 2500.0 nm.

6. The system of claim 5, wherein the second wavelength is between approximately 700.0 nm to approximately 780.0 nm and is visible to a human eye.

7. A computer-implemented system for capturing surveillance images, the computer-implemented system comprising:
   a housing containing a first light emitting diode (LED), a second LED, a camera module, and a limited power supply; the limited power supply providing power to each LED and the camera module;
   the first LED for generating light at a first wavelength;
   the second LED for generating light at a second wavelength that is different from the first wavelength;
   the camera module capturing a first image of an object without any activation of the first LED and second LED when the camera module does not detect a low lighting condition or a strong backlight condition; the camera module activating the first LED to capture a first image of the object with the first LED when a low lighting condition or a strong backlight condition is detected by the camera module, the camera module determining if a second image of the object is needed using the second LED; the camera module capturing a second image of the object with the second LED if the camera module determines that the second image of the object is needed, whereby the camera module conserves power for the limited power supply.

8. The system of claim 7, wherein the object comprises a license plate of a vehicle.

9. The system of claim 7, wherein the first wavelength is greater than the second wavelength.

10. The system of claim 9, wherein the first wavelength is between approximately 781.0 nm to approximately 2500.0 nm.

11. The system of claim 10, wherein the second wavelength is between approximately 700.0 nm to approximately 780.0 nm and is visible to a human eye.

12. The system of claim 7, wherein the first wavelength is approximately 850.0 nm and the second wavelength is approximately 740.0 nm.

13. The system of claim 7, wherein the camera module comprises at least one of an object detector module and a readability module.

14. The system of claim 7, wherein the limited power supply comprises at least one of a battery and a capacitor.

15. A system for capturing surveillance images, the system comprising:
   a housing containing a first light emitting diode (LED), a second LED, a camera processor, and a limited power supply; the limited power supply providing power to each LED and the camera processor;
   the first LED for generating light at a first wavelength;
   the second LED for generating light at a second wavelength that is different from the first wavelength;
   the camera processor capturing a first image of an object without any activation of the first LED and second LED when the camera processor does not detect a low lighting condition or a strong backlight condition; the camera processor activating the first LED to capture a first image of the object with the first LED when a low lighting condition or a strong backlight condition is detected by the camera module, the camera processor determining if a second image of the object is needed using the second LED; the camera processor capturing a second image of the object with the second LED if the camera processor determines that the second image of the object is needed, whereby the camera processor conserves power for the limited power supply.

16. The system of claim 15, wherein the object comprises a license plate of a vehicle.

17. The system of claim 15, wherein the first wavelength is between approximately 781.0 nm to approximately 2500.0 nm.

18. The system of claim 17, wherein the second wavelength is between approximately 700.0 nm to approximately 780.0 nm and is visible to a human eye.

19. The system of claim 15, wherein the processor comprises at least one of: a field gate programmable array (FPGA) and a digital signal processor (DSP).

* * * * *